(12) United States Patent
Gittel et al.

(10) Patent No.: US 6,454,499 B1
(45) Date of Patent: Sep. 24, 2002

(54) DEVICE AND METHOD FOR MACHINING WORKPIECES

(75) Inventors: Hans-Juergen Gittel, Rottenburg (DE); Ewald Westfal, Balingen (DE); Kurt Kalmbach, Alpirsbach (DE); Wilhelm Kalmbach, Schopfloch (DE); Roland Fischer, Dresden (DE); Michael Oertel, Dresden (DE)

(73) Assignees: Ledermann GmbH, Horb am Neckar (DE); Homag Maschinenbau AG, Schopfloch (DE)

( * ) Notice: Subject to any disclaimer, the term of this patent is extended or adjusted under 35 U.S.C. 154(b) by 0 days.

(21) Appl. No.: 09/951,395

(22) Filed: Sep. 14, 2001

(30) Foreign Application Priority Data

Sep. 25, 2000 (EP) .......................................... 00 120 851

(51) Int. Cl.⁷ .............................................. B23Q 11/00
(52) U.S. Cl. ..................... 409/131; 144/252.1; 409/137
(58) Field of Search ................................ 409/136, 137, 409/131, 228; 144/252.1

(56) References Cited

U.S. PATENT DOCUMENTS

| | | | | |
|---|---|---|---|---|
| 4,011,792 A | * | 3/1977 | Davis ...................... | 408/241 R |
| 5,031,364 A | * | 7/1991 | Belanger ...................... | 30/133 |
| 5,451,122 A | * | 9/1995 | Noda et al. ................. | 407/115 |
| 5,474,116 A | * | 12/1995 | Shoda ...................... | 144/252.1 |
| 5,615,983 A | * | 4/1997 | Hoekstra ..................... | 409/132 |

FOREIGN PATENT DOCUMENTS

| | | | | |
|---|---|---|---|---|
| DE | 36 02 419 | | 7/1987 | |
| DE | 94 20 668.6 | | 4/1995 | |
| DE | 297 01 486 | | 5/1997 | |
| DE | 299 06 758 | | 8/1999 | |
| JP | 6-170683 | * | 6/1994 | ................. 409/136 |
| WO | WO 00/48802 | | 8/2000 | |

* cited by examiner

Primary Examiner—William Briggs
(74) Attorney, Agent, or Firm—Nath & Associates PLLC; Gary M. Nath; Marvin C. Berkowitz

(57) ABSTRACT

The invention relative to a device for machining workpieces comprising: a chip removing, rotating tool (2) configured substantially as a hollow body including at least one cutter (4), a portion of the tool adjoining the cutter (4) being penetrated by a chip receiving opening (6) for communicating chips into a tool cavity; and an exhaust means including a stationary exhaust housing (10) configured substantially as a hollow body communicating with the cavity (8) at least in part and in connection with at least one exhaust air source; the communicating portion of the exhaust housing (10) comprising in the region of the cutter (4) a chip communicating window (26) porting into an exhaust passage (36) of the exhaust housing (10); and the exhaust passage comprising in an exhaust passage section upstream of the chip communicating window (26), relative to the exhaust direction, at least one auxiliary air infeed opening. The invention relates furthermore to a method for machining workpieces by means of one such device.

44 Claims, 4 Drawing Sheets

DEVICE AND METHOD FOR MACHINING WORKPIECES

BACKGROUND DESCRIPTION

1. Field of the Invention

The present invention relates to a device for machining workpieces, more particularly workpieces of wood-based materials, plastics or the like. invention relates furthermore to a method of machining workpieces by means of such a device.

2. Prior Art

Known from DE 195 09 933 C1 is a chip removing, rotating tool for machining workpieces, more particularly workpieces of wood-based materials, plastics or the like, which is configured substantially as a hollow body and comprises at least one cutter at its outer circumference. A portion of the tool adjoining each cutter is penetrated by a chip receiving opening for communicating the chips into a cavity, namely a quill shaft of the tool, i.e. the tool featuring internal chip removal. To assist removal of the chips materializing in operation of this tool it is possible to pass an air stream longitudinally, i.e. axially, through the quill shaft of the tool. Furthermore evident from this reference document is that chip removal may be additionally assisted by a conical configuration of the quill shaft of the tool.

In devices including the type of tool as described above a very high proportion of the resulting chips gains access to the cavity within the tool. Where wood-based materials are concerned, this proportion may be as high as approx. 95% to approx. 98% of the resulting chips.

Accordingly, chip removal or chip exhaust from the tool is especially of importance.

Experience has shown, however, that in conventional devices comprising tools with internal chip removal the chips can only be exhausted at a very high energy expense. For example, the energy requirement for such exhaust systems in woodworking operations is on an average between approx. 30% and approx. 50% of total electrical power consumption per year. This is why it would be desirable and good practice from both a technical and costeffective consideration to reduce the energy consumption for such exhaust systems.

In tools incorporating internal chip removal, a chip separated from the workpiece is usually accelerated by the cutter and moves through the chip receiving opening into the tool cavity. Due to the tool rotating, the air mass accommodated in the cavity is exposed to a centrifugal effect, however, as a result of which the entrained air tends to emerge outwardly from the chip receiving opening, i.e. the air mass flows in a direction which is precisely opposite to the direction of movement or trajectory of the chips entering the tool. This obstructs the movement of the chips into the tool cavity and the chips are decelerated or even directed back out of the chip receiving opening, it being particularly large chips that suffer from this disadvantageous effect. It is these unwanted effects that may result in chip removal being detrimented or even in the chip receiving opening becoming blocked which aggravates tool wear. Chips having regained access to the outer side of the tool or chips failing to be handled by the chip receiving opening and/or exhaust may, in addition, be multiply cut unnecessarily at the machining site of the tool, this likewise aggravating tool wear, resulting in reduced tool life and, last-but-not-least, in higher pollution of the ambient air.

In addition, chips having gained access to the tool cavity, but greatly decelerated are forced outwardly by the centrifugal force against the inner wall the tool cavity where they may accumulate and even become cemented. This substantially hampers chip removal and may even result in the tool becoming unbalanced which particularly at high tool rotating speeds is detrimental to operational safety.

Chips which are not removed and/or even regain access to the chip receiving opening may in addition accumulate or build up at the surface of the workpiece and cause undesirable chip marks, it being particularly multiply cut chips that result in ugly marking of the workpiece where softish materials are concerned, such as, for example, wood-based materials or plastics. This results in a reduction in workpiece quality which is, of course, undesirable.

This is why devices of the aforementioned kind equipped with tools, having internal chip guidance, require for satisfactory chip removal external high-power exhaust means for high exhaust velocities especially for high cutting speeds and rotary speeds, resulting, however, not only in a corresponding high power requirement but also causing a noise nuisance due to such exhaust systems.

However, the type of tool used as such has also proven to be a considerable source of noise. Thus, conventional tools, having internal chip removal, generate high noise emissions involving screeching and/or pulsating acoustic oscillations experienced by operators of the device to be extremely unpleasant, it thus also being desirable to reduce the noise emission produced by the device including its tools.

SUMMARY OF THE INVENTION

The objective or the technical problem forming the basis of the present invention is to provide a suitable device and a suitable method for machining workpieces which permit improved chip removal for a lower exhaust capacity and a reduced noise emission.

This technical problem is solved by a device in accordance with the invention having the features of claim 1.

This device for machining workpieces, more particularly workpieces of wood-based materials, plastics or the like comprises at least one chip removing, rotating tool configured substantially as a hollow body including at least one cutter, a portion of the tool adjoining the cutter being penetrated by a chip receiving opening for communicating chips into a tool cavity; and an exhaust means including a stationary exhaust housing configured substantially as a hollow body communicating with or protruding into the tool cavity at least in part and in connection with at least one exhaust air source;

the portion of the exhaust housing communicating with the tool cavity comprising in the region of an effective site of the tool assigned to the cutter at least one chip communicating window porting into an exhaust passage of the exhaust housing; and the exhaust passage comprising in an exhaust passage section upstream of the chip communicating window, relative to the exhaust direction, at least one auxiliary air infeed opening.

The tool of the device in accordance with the invention, which is to be classified as a tool having internal chip removal, may be configured one-part or multi-part. A multi-part tool may comprise, for example, a one-part or multi-part thin-walled quill body for connecting to a tool shaft or spindle and/or other components of the tool. The tool is formed preferably rotationally symmetrical, although the invention is not restricted to this configuration, however.

The at least one cutter of the tool, which may be a geometrically defined, straight, profiled or regular or irregular shaped cutter may be an integral part of the tool or, however, a separate part of the tool. The cutter may be configured more particularly interchangeable, the tool in this case expediently featuring a suitable quick-change means. The number of tool cutters depends on the application in each case.

Instead of a single cutter, it is, of course, just as possible that two or more cutters find application. The cutters are preferably applied to the radial outer circumference of the tool. However, the tool may also comprise in addition facing cutters.

The exhaust housing may be one-part or multi-part. As already mentioned above, the exhaust housing is arranged stationary. More particularly, the part of the exhaust housing communicating with or protruding into the tool cavity at least in part may be adjustable as regards its stationary arrangement, however. The part of the exhaust housing communicating with or protruding into the tool cavity is preferably formed rotationally symmetrical at its sections located opposite the inner wall the tool cavity. It is, however, expressly to be noted that the invention is not restricted to this configuration. The part communicating with the cavity may also be configured asymmetrical or irregular, or comprise irregularly shaped sections. The exhaust housing is expediently equipped with fastener means and/or connector means for producing a connection to other components of the device, such as, for example, a device frame or exhaust air source. The exhaust housing may incorporate guide means such as e.g. baffles, grooves, passages or the like for the air stream flowing in its interior The chip communicating window extends preferably over substantially the full height of the section of the exhaust housing communicating with the tool cavity. The width of the chip communicating window as measured in the rotational direction of the tool at the outer circumference of the pot section 12 communicating with the tool cavity is selected as a function of the fanout of the chip trajectory as materializing for a particular application. More particularly, it is good practice to select the width smaller than the pitch of the tool cutters. The width of the chip communicating window may be defined either fixed or, however, also variably adjustable e.g. by shifter elements, interchangeable window inserts or the like. The location of the middle of the window relative to the width may be either symmetrical or asymmetrical to the position of the active site of the tool and also manipulated by changing the stationary position of the exhaust housing relative to the active site of the tool. For this purpose suitable adjusting means may be provided.

Preferably the free communicating cross-section of the exhaust passage is reduced in the direction of the exhaust air source.

The auxiliary air infeed opening may be, for example, a drilling, recess or the like porting directly or indirectly into the exhaust passage. The auxiliary air infeed opening may be connected via an auxiliary air passage to the exhaust passage. The opening of the auxiliary air infeed is provided preferably in a portion of the exhaust housing provided outside of the rotating tool. The term "auxiliary air" as formulated in the sense of the invention is intended to indicate an air stream flowing through the auxiliary air infeed opening positively influencing another air stream flowing in the exhaust housing, namely an air stream flowing pulsating through the chip receiving opening and the chip communicating window into the exhaust passage due to rotation of the tool and the effect of the exhaust air source, i.e. exerting an auxiliary effect in achieving, in the end, a main air stream having specifically desirable properties in the exhaust passage. This aspect will be detailed later on.

The device in accordance with the invention has the following advantages.

Due to the stationary section of the exhaust housing communicating with the tool cavity, the tool cavity is decoupled from the conditions existing predominantly therein due to rotation of the tool, and other more favorable operating conditions are created.

In the solution in accordance with the invention the section of the exhaust housing protruding into the tool cavity more or less fills the cavity, the inner wall of the cavity being located directly opposite the outer wall of the communicating section of the exhaust housing over an interspace normally only being a minimum, as a result of which no substantial air mass volume exists in the tool cavity which could be exposed to a centrifugal effect caused by rotation of the tool. The interspace between the outer side of the exhaust housing section, radial relative to the axis of rotation of the tool, and the radial inner side of the tool is insufficient for this purpose. The section of the exhaust housing communicating with the tool cavity is arranged stationary and accordingly the cavity of this exhaust housing section is free of all and any centrifugal force effects of the tool rotating about the exhaust housing section, i.e. now, no air stream can build up within this section of the exhaust housing communicating with the tool cavity which flows outwardly to the inner wall of the tool or the chip receiving opening and precisely opposing the direction of movement or natural trajectory of the chips entering the tool.

Thus, a chip parted from the cutter(s) flies, after leaving the chip receiving opening of the tool, over a negligibly small interspace directly through the chip communicating window into the exhaust passage without being influenced by the rotating tool located outside. This is why the movement of the chips into the exhaust passage is neither obstructed nor decelerated or even carried back from the chip receiving opening. This is to be viewed as a major advantage, especially where large chips are concerned. Unlike conventional devices featuring an opposing flow to disadvantage, in the device in accordance with the invention, chip removal is not detrimented whilst effectively avoiding blockage of the chip receiving opening in thus aggravating tool wear. The possibility of chips gaining access from the tool cavity or the exhaust passage back to the outer side of the tool where they are recut by the cutters is also external slight, this likewise contributing to a reduction in tool wear, achieving higher tool life and less pollution of ambient air.

Because in the configuration in accordance with the invention, the chips entering the tool cavity and the exhaust passage are not decelerated, and the interspace between the wall of the tool cavity and the outer wall of the communicating exhaust housing section is small, there is now little probability of chips gaining access to this interspace and being forced by the centrifugal effect of the rotating tool against the inner wall where they accumulate and even form a blockage. This likewise facilitates chip removal and avoids unbalance of the tool due to chips accumulating. This is particularly conducive to the operating safety and accuracy of the tool when operating at high speeds.

Due to the fact that, as a result of the effect as mentioned previously in operation of the device in accordance with the invention, hardly any chips gain access back to the outer side of the tool assigned to the workpiece, chip accumulation or deposits at the surface of the tool as well as the marks resulting therefrom can now be effectively avoided. Recutting of the already separated chips and marks spoiling the appearance of the workpiece as a result thereof, are hardly observed with the device in accordance with the invention, all of which results in an improvement in the useful life and quality of the tool.

It is to be noted at this point that the positive effects of the device in accordance with the invention as explained above can already be achieved by providing the exhaust housing section communicating at least in part with the tool cavity without activation of the exhaust air source being mandatory for this purpose. However, operating the exhaust air source and thus active chip exhaust enhances the advantageous effect of the said exhaust housing section as detailed in the following.

Since the chips, as mentioned above, fly non-decelerated through the chip communicating window into the exhaust passage and have a relatively high kinetic energy, this movement energy can be made use of to discharge the chips. Accordingly, exhausting the chips is thus achievable with low power and low air mass flow which merely needs to be sufficient to transport the chips from the tool to a chip bunker or the like. Even at high cutting speeds or high rotary speeds no particularly high exhaust velocities or high power exhaust means are needed for effective chip removal. This thus enables not only the power requirement but also the noise nuisance caused by the exhaust system to be reduced.

However, the noise emission caused by the tool itself is considerably reduced in using the device in accordance with the invention. Due to the section of the exhaust housing protruding into the tool cavity in connection with the provision of the auxiliary air infeed opening the tool cavity is namely decoupled acoustically to the same degree and both the acoustical and the flow-technical conditions in the tool cavity are positively influenced.

When the exhaust air source is active, a flow of (outside) air usually flows from the outer side of the tool through the chip receiving opening and the chip communicating window into the exhaust passage. Since the hollow tool with its chip receiving opening rotates about the chip communicating window, the path of the flow through the chip communicating window is thus periodically closed and reopened, resulting in (similar to the situation with the prior art tool as mentioned at the outset) a pulsating air stream, which in the absence of some corrective means would generate very loud and extremely unpleasant screeching and/or pulsating acoustical oscillations. In accordance with the invention an auxiliary air flow is made available by means of the auxiliary air flow infeed opening which, within the exhaust passage, is blended with or superimposed by the air stream entering pulsating through the chip communicating window. This results in a substantially constant exhausting main air stream flowing within the exhaust passage along the chip communicating window.

Due to the pulsating air stream being blended or superimposed with the auxiliary air stream the peaks in the pulsation are reduced or damped in also avoiding resonant-type oscillations in thus enabling noise emission and the extremely unpleasant screeching and/or pulsating acoustical oscillations to be substantially reduced. This high consistency of the main air stream, as compared to a pronounced pulsating air stream, is to be attributed to the fact that air can always be drawn in through the auxiliary air infeed opening even when the chip communicating window is periodically closed, due to tool comprising the chip receiving opening rotating about the chip communicating window.

Since, in addition to this, the main air stream flows along the inner side of the exhaust passage at the chip communicating window and thus allowing no dead space to materialize, any undesirable deposits or accumulations of chips at the rims or edges of the chip communicating window or peaks in the pulsation adjoining thereto are reliably eliminated.

In summary, the device in accordance with the invention thus permits considerable improved chip removal, with the aid of which the chips can be intercepted and discharged to an extremely high percentage whilst significantly reducing the exhaust air and power needed therefor (by as much as approx. 50%) whilst simultaneously reducing the noise emission with its disadvantageous acoustical effects. All these advantages are achieved with relatively little complication and expense in production. The device in accordance with the invention works high effectively in both a technical and cost-effective sense in ensuring high machining quality.

In accordance with one advantageous aspect of the device in accordance with the invention the tool is substantially configured as a pot-type hollow body. This pot-type shape, be it cylindrical, conical, bell-shaped or also regular or irregular shaped, and especially also including a rotationally symmetrical configuration, is particularly of advantage for use in conjunction with the exhaust housing communicating with or protruding at least in part into the tool cavity.

In addition, the part of the exhaust housing communicating with the tool cavity is preferably configured such that it totally fills the cavity substantially. "Substantially" in this respect means that a sufficient, preferably small, gap of the interspace always remains between the outer circumference or outer surface areas of the exhaust housing and the inner circumference or inner surface areas of the tool to ensure safe operation of the rotating tool. Arranging for the corresponding tool cavity to be filled practically totally ensures more particularly that the radial distances between the chip receiving opening of the tool and the chip communicating opening of the exhaust housing can be maintained small, and in active operation of the device no large quantities of chips gain access to the tool cavity or between the cavity wall and outer surface areas of the exhaust housing where they could possibly undesirably accumulate or deposit due to the centrifugal effect or force thereof.

Another advantageous aspect of the invention provides for the part of the exhaust housing communicating with the tool cavity being configured pot-shaped in thus enabling this part of the exhaust housing to close off against the tool cavity and, in conjunction with further device features, as detailed later, specifically desirable flow conditions can be achieved in the interior of the exhaust housing. The pot-type section of the exhaust housing may be rotationally symmetrical to the remote portions of the exhaust housing so that for various applications differingly configured pot-type hollow bodies can be interchanged with no undue complication in assembly and disassembly.

In yet another preferred aspect of the device in accordance with the invention, fitted with a tool whose cavity is shaped cylindrical, the part of the exhaust housing communicating with the tool cavity is likewise substantially cylindrical in shape. Furthermore, it is good practice with a device in accordance with the invention fitted with a tool whose cavity is conical, when the part of the exhaust housing communicating with the tool cavity is also configured substantially conical. Both of the variants as aforementioned ensure, for one thing, that in the case of a substantially or totally rotationally symmetrical tool, the outer circumference of the exhaust housing can be adapted to a small interspace in the tool cavity and the distance between the chip receiving opening of the tool and the chip communicating opening of the exhaust housing is in turn to be maintained small. Where a tool is concerned having a conical cavity which assists, on rotation of the tool, removal of the chips having gained access to the tool cavity, the chips can thus be removed through the interspace formed between the inner surface areas of the tool and the conical outer surface areas of the exhaust housing. The tool cavity and the part of the exhaust housing communicating with the tool cavity feature preferably the same degree of conicity, although it is just as conceivable to configure the degree of conicity of these two parts slightly different or even to combine a conical wall of the tool cavity with a cylindrical outer wall of the exhaust housing.

Preferably the exhaust housing comprises a communicating opening or a recess for receiving a drive means, more particularly a shaft or spindle of the rotating tool. Due to the hollow or pot-type configuration of the tool this can be mounted or sleeved onto the exhaust housing to permit achieving a low-profile configuration. The communicating opening or recess is preferably defined by a parting wall or the like relative to other cavities of the exhaust housing, more particularly however relative to the exhaust passage of the exhaust housing.

In accordance with still another advantageous aspect of the device in accordance with the invention, the exhaust passage defines a flow path substantially radial relative to the axis of rotation of the tool which, starting from the auxiliary air infeed opening, guides along the chip communicating window in the direction of the exhaust air source.

The main air stream guided on this radial flow path thus runs substantially in the same direction as the natural trajectory of the chips as gaining access through the chip receiving opening of the tool and chip communicating window into the exhaust passage. As soon as the chips have passed through the chip communicating window, they are relieved of the effect of a centrifugal force existing otherwise in the tool cavity. Since the chips, directly after being generated by the tool, already have a considerable kinetic energy and are neither decelerated nor substantially deflected, their kinetic energy can be made use of directly for discharging the chips. In other words, the chips actively assist, to a certain degree, chip removal of their own accord. Since, in addition, the main air stream flows practically in the same sense as the chip trajectory, only a small amount of kinetic energy of the air mass flow is needed in turn for further chip discharge. This has the result, in all, that the efficiency of chip removal is substantially enhanced whilst enabling the power of the exhaust means or the exhaust air source to be considerably reduced as a whole. Since, in addition, the main air stream flows along the inner side of the exhaust passage at the chip communicating window in thus preventing dead space materializing, any tendency of the chips to accumulate or block the rims and edges of the chip communicating window or in adjoining passage portions is reliably prevented.

Experience has additionally indicated it to be good practice to extend the exhaust passage, starting from the chip communicating window or the auxiliary air infeed opening and relative to the axis of rotation of the tool, substantially radial in the form of a circular arc or spiral about the axis of rotation. Configuring the run of the exhaust passage in the form of a circular arc or spiral in the sense of the invention is also to be understood as a spiral extension of the exhaust passage. The exhaust passage may be guided only in part, substantially completely or even in several windings about the axis of rotation. It is this configuration that in turn permits guidance of the main air stream adapted to the chip trajectory as predominantly natural in the interior of the exhaust housing whilst permitting, in addition, a highly compact and flow-technically favorable configuration of the exhaust housing and exhaust passage, It is for this reason that the chips themselves can be reliably exhausted with less power of the exhaust air source than as required by conventional devices, since it is easy for them to follow the course of the exhaust passage, as described, as well as the flow existing predominantly in the exhaust passage.

In this context, it has been discovered to be good practice to configure the exhaust passage such that the twist direction of the extent of the exhaust passage, in the form of a circular arc or spiral, and the direction of rotation of the tool in the same sense, since for this type of tool the direction of rotation corresponds likewise to the natural chip trajectory in the interior of the tool or exhaust housing.

The exhaust housing comprises preferably at least one ancillary exhaust passage which is connected to the at least one exhaust housing ancillary opening provided at an exhaust housing section located outside of the tool, the ancillary exhaust passage defining a flow path for an ancillary air stream and porting into an exhaust passage section downstream remote from the chip communicating window relative to the exhaust direction into the exhaust passage. With the aid of the ancillary exhaust passage and the exhaust housing ancillary opening, chips occurring outside of the tool or outside of the portion of the exhaust housing communicating with the tool cavity, not gaining access to the tool cavity and/or through the chip communicating window to the exhaust passage, are captured and likewise discharged. Merging the auxiliary air stream and main air stream at an exhaust passage section downstream remote from the chip communicating window relative to the exhaust direction ensures that the auxiliary air stream has no negative effect on the main air stream in the vicinity of the chip communicating window. Since the ancillary exhaust passage ports into the exhaust passage, no separate exhaust air source is needed for operating the ancillary exhaust passage, i.e. instead use being made of the same exhaust air source as put to use for the exhaust passage itself, although, of course, it is basically possible to connect the ancillary exhaust passage to a separate exhaust means or exhaust air source.

For certain applications it has been demonstrated to be good practice to configure the front rim of the chip communicating window, relative to the direction of rotation, substantially recessed or shaped concave. The front window rim is understood to be the rim to which the cutters of the rotating tool run, it having been demonstrated to be good practice that this configuration contributes, among other things, to a further reduction in the noise emission of the tool.

In one particularly advantageous aspect of the device in accordance with the invention it is provided for that the chip communicating window has at least one irregular shaped window rim. In this way, an outside air stream flowing pulsating through the chip communicating window into the exhaust passage of the exhaust housing, due to the rotation of the tool and the effect of the exhaust air source, is swirled at the irregular shaped window rim more or less automatically. At the same time, an air layer entrained by the rotation of the tool in the cavity thereof and flowing along the outer side exhaust housing protruding into the tool cavity, is automatically swirled by the irregular shaped window rim. It has been discovered that the negative acoustical oscillations occurring in conventional devices and tools can be considerable reduced by this constructive detail.

The positive effect, as described above, of the irregular shaped window rim is particularly of advantage when the irregular shaped window rim is configured at a side of the chip communicating window extending transversely to the direction of rotation of the tool. It is to be noted at this point expressly, however, that the irregular shaped window rim is not restricted exclusively to this arrangement, i.e. the other window rims may just as well be shaped irregular. In this case, preference is given more particularly to a variant in which both the front and the rear window rim, relative to the direction of rotation, are shaped irregular.

The irregular shaped window rim as cited above may be achieved, for example, by way of toothed or jagged protuberances and recesses, whereby the protuberances and recesses may be formed regular or irregular and comprise shapes, dimensions and distributions which may be the same or differ over each window rim. In accordance with a further preferred aspect of the device in accordance with the invention the toothed or jagged protuberances and recesses are configured corrugated, although, of course, mixed shapes of the configurations of the irregular shaped window rim as described above are just as conceivable. In addition, the irregular shaped window rims of the chip communicating window may comprise an irregular shape or configuration or, however, similar to or differing from each other.

It has, in addition, been discovered to be an advantage that at least one front window rim, relative to the direction of rotation of the tool, (i.e. the window rim to which the cutters run in operation) of the chip communicating window comprises a chip sweeper, although it is just as possible to provide such sweeper means at the other window rims of the chip communicating window. The chip sweeper may be a separate means or, however, an integral component of the corresponding window rim and/or of the exhaust housing. In the case of it being an integral component, it is especially the window rim of the chip communicating window shaped irregular as described above that may function as such an integral chip sweeper. Movably arranged sweepers with or without their own drive as well as nozzle-type elements jetting a stream of air, gas or liquid are to be appreciated as chip sweepers in the sense of the invention.

Preferably the front window rim comprises a first sweeper edge, radial relative to the axis of rotation, which protrudes beyond the rear window rim radial relative to the radial extension of the rear window rim. When the exhaust housing is shaped cylindrical, for example, and the chip communicating window is provided at a cylindrical outer circumferential surface area of the exhaust housing, then the radial first sweeper edge protrudes beyond the cylindrical diameter. The radial first sweeper edge is configured preferably as an irregular shaped window rim so that the edge or window rim is able to assume a dual function.

In addition to this, it has been discovered to be good practice when the front window rim of the device in accordance with the invention comprises a second sweeper edge axial relative to the axis of rotation of the tool protruding beyond the axial face of the section of the exhaust housing communicating with the tool cavity. This second sweeper edge preferably serves to sweep chips or chip debris through the chip communicating window into the exhaust passage gaining access axial to the outer side of the portion of the exhaust housing communicating with the tool cavity between the inner surface areas of the tool and the outer surface areas of the exhaust housing. The axial second sweeper edge thus reliably removes chip debris which would otherwise undesirably accumulate and become deposited at a section of the tool cavity adjoining the face portion of the exhaust housing.

The sweeper edges as cited above may be configured either sharp edged or blunt and shaped in the form of a cutting edge, blade or even a hook.

In harmony with another aspect of the device in accordance with the invention, the axial face of the section of the exhaust housing communicating with the tool cavity comprises a face closing off this section axially, the face incorporating a face opening porting into the exhaust passage. It is in this face that also the communicating opening or recess for receiving a drive means, such as for example a shaft or spindle of the tool, as described above, may be provided. The closure formed by the face may be configured integrally with the remaining sections of the exhaust housing or releasably configured like a cap, permitting access to the interior of the exhaust housing without requiring disassembly of the complete exhaust housing from the other components of the device. By providing the face and the closure of the exhaust housing configured in this way axially, it is in addition particularly simple to achieve a pot-type shape of the section of the exhaust housing communicating with the tool cavity. This prevents an uncontrolled intake of air at locations of the exhaust housing not intended for this purpose and thus contributes to achieving flow conditions as specifically desirable within the exhaust housing. In turn, this face opening permits exhaust and guidance into the exhaust passage of chips or chip debris possibly gaining access to the face of the exhaust housing or the bottom region of a pot-shaped tool. The interspace between the inner surface areas of the tool and the outer surface areas of the exhaust housing protruding into the tool cavity can thus be maintained free of chips which also reduces wear.

Preferably the face opening ports into the chip communiating window. Chips or chip debris exhausted via the face opening can thus be directly communicated through the chip communicating window into the exhaust passage; and no additional passages and/or an additional exhausting source is needed to exhaust the face opening.

In accordance with still another preferred aspect of the device in accordance with the invention, the face opening in the region of the radial first sweeper edge and/or in the region of the axial second sweeper edge ports into the chip communicating window. Due to the flow passing through the face opening, the effect of the corresponding sweeper edges is thus assisted, and chips or chip debris not captured by the corresponding sweeper edge can thus be captured and discharged due to the flow conditions at the edge of the chip communicating window as induced by the air stream flowing through the face opening.

In one particularly advantageous embodiment of the device in accordance with the invention, it is furthermore provided with an exhaust hood surrounding or enclosing the tool at least in part, or indeed substantially totally in certain applications, as may be achieved in the radial and/or axial direction of the tool. With the aid of the exhaust hood, chips materializing at the outer side or outside of the tool and/or outside of the cutter trajectory and/or outside of the actual exhaust housing can be intercepted which cannot be captured by the exhaust housing communicating with the tool cavity. Relative to the tool or the body thereof it is thus possible in this way to achieve an external chip removal or a kind of external chip guidance.

The exhaust hood may comprise one or more exhaust hood passages, for example in the form of partial passages, several passage sections, grooves, guide means such as for instance baffles and the like, thus making it possible to undertake exhaust simultaneously at different locations as well as to specifically influence chip guidance in directing the chips to specifically desirable locations of the device.

Preferably the exhaust hood is connected to the ancillary exhaust passage of the exhaust housing. This permits the exhaust means or exhaust air source provided for the exhaust housing to also be made use of for operating the exhaust hood, thus eliminating the need for a separate exhaust means or exhaust air source and permitting a very compact configuration of the function unit formed by the exhaust housing and the exhaust hood.

In accordance with still another aspect of the device in accordance with the invention, the exhaust hood juts beyond the tool axially, thus enabling the exhaust hood to also capture chips flung out to a spatial location axially remote from the actual activity site of the tool.

In an additional advantage embodiment of the device in accordance with the invention, it is provided for that the exhaust hood comprises an irregular shaped exhaust hood opening rim. Similar to the irregular shaped window rim of the chip communicating window, as described above, the irregular shaped opening rim of the exhaust hood may likewise comprise toothed or jagged protuberances and recesses or be configured corrugated. The protuberances may in turn be shaped and/or distributed regular or irregular and/or comprise the same or differing configurations and dimensions, although, of course, mixed shapes of the variants as cited above are just as possibility. These means prevent disadvantageous acoustical effects due to the air stream entering through the exhaust hood opening (termed additional air stream in this case) and thus considerably reduce the noise emission generated thereby.

It is more particularly in conjunction with the machining of straight workpiece edges and rims that an aspect of the device in accordance with the invention has produced good results in which the opening rim of the exhaust hood extends substantially tangentially relative to the axis of rotation and a cutter trajectory diameter of the tool from which it is slightly set back in the direction of the axis of rotation. In actual practice the amount of this set-back corresponds to a dimension which is slightly greater than the cutting depth of the tool cutters. This is why in active operation of the device, the opening rim of the exhaust hood extends tangentially directly opposite the straight workpiece edge to be machined over a very small interspace, as a result of which the chips generated at active site of the tool, not gaining access through the chip receiving opening of the tool and through the chip communicating window of the exhaust housing to the exhaust passage, can be excellently captured and discharged to a high degree. The technical problem forming the basis of the invention is furthermore solved by a method in accordance with the invention having the features of claim 29.

This method for machining workpieces, more particularly workpieces of wood-based materials, plastics or the like, by means of a device as set forth in any of the claims 1 to window rim 28 comprises the following steps for exhausting chips materializing in machining:

generating a main air stream flowing substantially constant, exhausting and within the exhaust passage along the chip communicating window.

The method in accordance with the invention offers substantially the same advantages as those of the device in accordance with the invention as already explained above.

In accordance with one preferred, advantageous aspect of the method in accordance with the invention this comprises the step in the method in which the main air stream is directed on a substantially radial flow path, relative to the axis of rotation of the tool, starting from the auxiliary air infeed opening, along the chip communicating window in the direction of the exhaust air source. It is in this way that the main air stream runs substantially in the same direction as the natural trajectory of the chips entering the exhaust passage through the chip communicating window to thus actively assist chip removal to a certain extent. This, in turn, results in the effect of chip removal being enhanced whilst reducing the total power of the exhaust means or exhaust air source as needed for chip discharge. Since the main air stream flows at the inner side of the exhaust passage along the chip communicating window, and thus producing no dead space, this reliably prevents any undesirable deposits or accumulation of chips at the rims or edges of the chip communicating window or portions of the passage adjoining thereto.

In addition, the method in accordance with the invention comprises a variant including a step in the method which is characterized by generating and making available at least one substantially constant exhausting ancillary air stream within the ancillary exhaust passage connected to the ancillary opening of the exhaust housing. Generating and making available the ancillary air stream makes it possible to undertake an additional chip exhaust also at other locations within and/or outside of the section of the exhaust housing communicating with the tool cavity. More particularly, it is possible in this way to also capture chips occurring at an external portion of the tool and not gaining access to the tool cavity and/or through the chip communicating window into the exhaust passage.

In a further preferred step in the method the main air stream and ancillary air stream are merged at a flow section downstream remote from the chip communicating window relative to the exhaust direction. This ensures, for one thing, that the ancillary air stream does not negatively influence the main air stream in the vicinity of the chip communicating window whilst, for another, making it possible in generating and making available the ancillary air stream to make use of, at no additional expense, the means which also find application for generating and making available the main air stream. However, it is basically possible to generate and provide the ancillary air stream also with the aid of separate means.

The method in accordance with the invention offers, in addition, an advantageous variant comprising a step in the method characterized by automatically swirling a stream of outside air flowing pulsating through the chip communicating window into the exhaust passage of the exhaust housing due to rotation of the tool at at least one window rim of the chip communicating window. In this way disadvantageous acoustical oscillations at the chip communicating window can be avoided and the total noise emission of the tool considerably reduced in implementing the method.

More particularly in this case a step in the method in accordance with the invention is also to be viewed as being useful and helpful in which a layer of air entrained due to the rotation of the tool in its cavity and flowing at an outer side of the exhaust housing protruding into the tool cavity and along the chip communicating window is automatically swirled at at least one window rim of the chip communicating window. This too, contributes towards reducing the noise emission.

In yet another advantageous step in the method in accordance with the invention, the pulsating inflowing outside air stream is mixed with the substantially constant main air stream in the exhaust passage. Due to the resulting superimposing effect, peaks in the pulsation of the acoustical oscillations stemming from the pulsating flow condition can be diminished and resonant type oscillation conditions avoided. This in turn contributes towards reducing noise emission and nuisance.

The method in accordance with the invention comprises furthermore an advantageous step in the method which is characterized by generating and making available a substantially constant exhausting additional air stream at an outer side of the tool. This aspect also permits chips materializing at a spatial location outside of the tool and/or outside of the cutter trajectory and/or outside of the exhaust housing and/or at the outer surface areas of the tool itself to be exhausted, not permitting capture by the main air stream, in thus achieving an external chip guidance.

It is to be noted at this point that the invention makes a distinction between an ancillary air stream and an additional air stream, since the ancillary air stream may be an air stream which must not necessarily flow outside of the exhaust housing, whereas the additional air stream is understood to be an air stream which flows at an outer side of the tool and thus, as a rule, also outside of the actual exhaust housing.

However, there are certain circumstances under which the additional air stream may also represent an ancillary air stream or translate into the ancillary air stream. This is e.g. the case when the exhaust hood or at least one of its passages is directly connected to the exhaust housing ancillary opening of an ancillary exhaust passage. When both an additional air stream and an ancillary air stream, separate therefrom, is provided, these two streams may be merged and in this way the chips entrained by them discharged on a common further flow path which facilitates later collection and disposal of the chips. In addition to this, this step in the method offers the possibility of generating the additional air stream with the aid of the ancillary air stream flowing in the ancillary exhaust passage so that separate means for generating the additional air stream can be dispensed with, although it is just as conceivable to provide for a totally separate guidance of the additional air stream and/or separate means for generation thereof.

Preferably the additional air stream is automatically swirled at at least one opening rim of the exhaust hood in avoiding disadvantageous acoustical effects, due to the additional air stream flowing into the exhaust hood opening, and reducing undesirable noise emission.

In conclusion, the method in accordance with the invention also comprises an advantageous step in the method which is characterized by automatically swirling of an air layer entrained due to rotation of the tool at the outer side thereof and flowing along an exhaust hood opening at the at least one exhaust hood opening rim, this too making a positive contribution towards avoiding disadvantageous acoustical effects and reducing noise emission.

BRIEF DESCRIPTION OF THE DRAWINGS

Preferred example embodiments of the invention including additional aspects will now be detailed with respect to the attached drawings in which.

DESCRIPTION OF PREFERRED EXAMPLE EMBODIMENTS OF THE INVENTION

Figure 1:
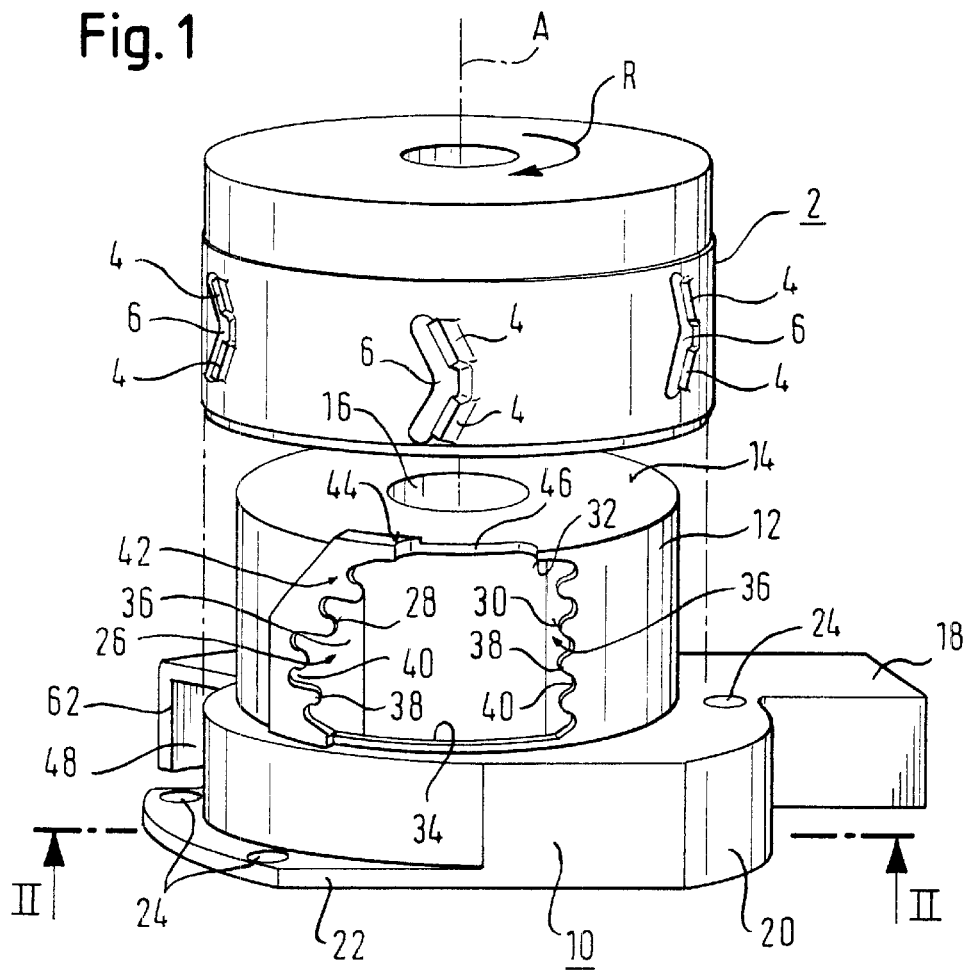
FIG. 1 is a diagrammatic view in perspective of a substantial portion of a first embodiment of the device in accordance with the invention including a tool and an exhaust housing.

Like parts and components are identified by like reference numerals in the following description and in the FIGS. to avoid tedious repetition, unless a differentiation needs to be made.

Referring now to FIG. 1 there is illustrated a diagrammatic view in perspective of a substantial portion of a first embodiment of a device in accordance with the invention for machining workpieces, more particularly workpieces of wood-based materials, plastics or the like. The device comprises a machining, rotating tool 2 configured substantially as a thin-walled, cylindrical, pot-shaped hollow body. The axis of rotation of the tool 2, which in this case runs vertically, is characterized by the reference numeral A. The direction of rotation of the tool 2 is identified by an arrow R. In the present case, the tool 2 is equipped with several geometrically defined cutters 4, arranged and distributed evenly at the radial outer circumference of the tool 2 and its tool basic body respectively. A portion of the tool 2 adjoining each cutter 4 is penetrated by a chip receiving opening 6 for communicating chips into a cavity 8 of the tool 2.

The device comprises furthermore an exhaust means including a stationary exhaust housing 10. This exhaust housing 10 is configured substantially as a thin-walled hollow body and communicating by a cylindrical, pot-type shaped exhaust housing section, termed short pot section 12 in the following, partly with the cavity 8 of the tool 2. The pot section 12 which is practically closing off by a face 14 fills the tool cavity 8 substantially totally so that between the outer surface areas of the pot section 12 and the inner surface areas of the tool cavity 8 only a minor gap remains which ensures unobstructed rotation of the tool 2 about the pot section 12. Provided at the face of the pot section 12 is a communicating opening 16 for a drive shaft (not shown) of the tool 2. The communicating opening 16 extends through the complete exhaust housing 10. The exhaust housing 10 is in connection with at least one exhaust air source (not shown) via a connection 18. The portion of the exhaust housing 10 located outside of the tool 2 comprises a housing base 20 including a plate-shaped housing foot 22 and bolting holes 24 via which the exhaust housing 10 is secured to a device frame (not shown to make for an uncluttered illustration).

As clearly evident from FIG. 1 the pot section 12 communicating or protruding into the tool cavity 8 of the tool 2 comprises in the region of an active site of the tool 2, assigned to each cutter 4, a chip communicating window 26 including several window rims 28, 30, 32, 34. The chip communicating window 26 ports into an exhaust passage 36 of the pot section 12 and exhaust housing 10 respectively as detailed later. The chip communicating window 26 extends axially, relative to the tool centerline A, over substantially the full height of the pot section 12 communicating with the cavity 8 of the tool 2. The mean width of the chip communicating window 26, as measured relative to the direction of rotation R at the radial outer circumference of the pot section 12 is smaller than the pitch of the cutters 4 at the tool cavity.

In FIG. 1 the front window rim of the chip communicating window is identified by the reference numeral 28 and the rear window rim is identified by the reference numeral 30.

Both window rims 28, 30 extend substantially transversely to the direction of rotation R of the tool 2. It is evident from the drawing that the front window rim 28, in its basic configuration, is recessed approximately concave whilst the rear window rim 30, in its basic configuration, is configured substantially straight and runs approximately parallel to the axis of rotation A. In addition, the front window rim 28 and rear window rim 30 each feature an irregular rim shape, formed by toothed or jagged protuberances 38 and recesses 40 machined from each aforementioned basic configuration of the corresponding rim 28, 30. The toothed or jagged protuberances 38 and recesses 40 are corrugated in the present example embodiment.

The front window rim 28 is additionally fitted with a chip sweeper which in this case is formed by radial first sweeper edge 42 of the front window rim 28 itself relative to the tool centerline A. This first sweeper edge 42 protrudes, relative to the radial extension of the rear window rim 30, radially beyond the rear window rim 30. In other words the first sweeper edge 42 protrudes slightly beyond the cylindrical, radial outer surface area of the pot section 12. Provided in addition at the front window rim 28, i.e. at the transition portion to the upper window rim 32, is a second sweeper edge 44 axial relative to the tool centerline A of the tool. This second sweeper edge 44 protrudes upwards slightly beyond the face 14 of the pot section 12 and in the plan view (see FIG. 2) is slightly hook-shaped.

Provided in the face 12 of the pot section 12 is a face opening 46 which ports into the exhaust passage 36 and in the region of the radial first sweeper edge 42 as well as in the region of axial second sweeper edge 44 into the chip communicating window 26.

Figure 2:
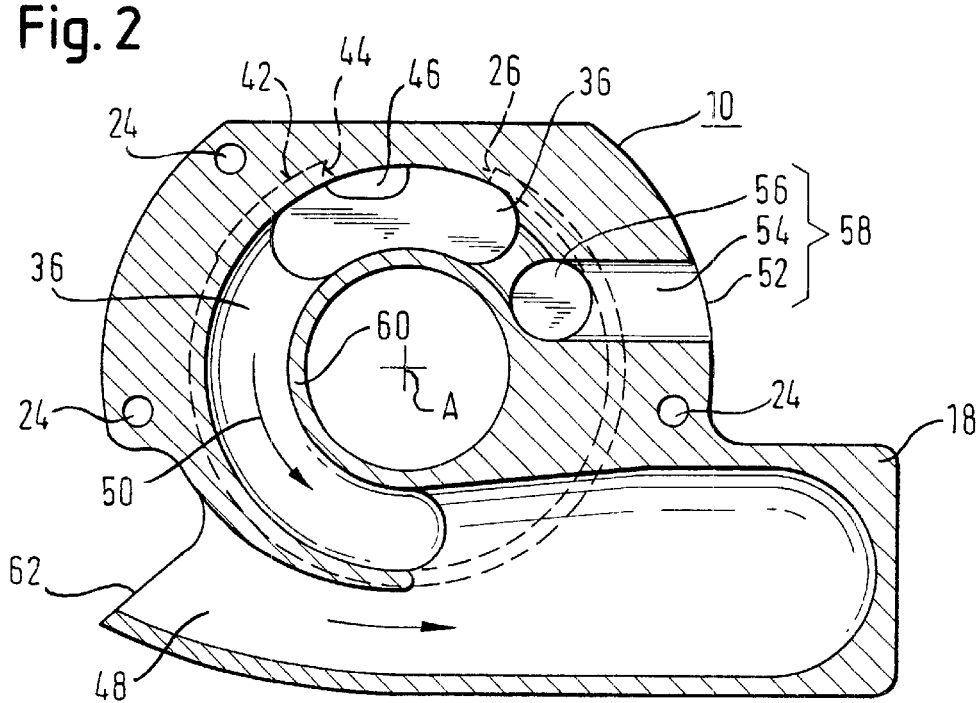
FIG. 2 is a view from underneath of the exhaust housing as taken along the line II—II in FIG. 1.

Referring now to FIG. 2, which is a view from underneath of the exhaust housing 10 as taken along the line II—II in FIG. 1, further details of the exhaust housing 10 are evident. The underside of the exhaust housing 10 is configured flat. The exhaust passage 36 as well as an ancillary exhaust passage 48, detailed later, are formed by groove-type depressions or recesses which, starting from the underside are machined from the exhaust housing 10 and its pot section 12. In the present example the exhaust housing 10 is shaped, to a certain extent, as a split-shell which is not closed off until secured to another corresponding stationary part of the device.

In an exhaust passage section adjoining the chip communicating window 26 downstream, relative to the exhaust direction as indicated by an arrow 50, the exhaust passage 36 comprises an auxiliary air infeed opening 52. The auxiliary air infeed opening 52 is formed by a groove-type recess 54 in a portion of the exhaust housing located outside of the pot section 12, it being communicatingly connected to the exhaust passage 36 via a countersunk drilling 56. The groove-type recess 54 and the countersunk drilling 56 form a short auxiliary air passage 58 via which the auxiliary air infeed opening 52 is connected to the exhaust passage 36.

As furthermore evident from FIG. 2 the exhaust passage 36 and the auxiliary air infeed opening 52 or auxiliary air passage 58 resp. are parted by a chip receiving opening 60 from the communicating opening 16 provided for the tool shaft so that no air intake is possible via this communicating opening 16. As evident from FIG. 2 furthermore the exhaust passage 36 extends, starting from the auxiliary air infeed opening 52 or the auxiliary air passage 58 and relative to the axis of rotation A of the tool 2, substantially radial as a circular arc in approximately a half to a three-quarter turn about the axis of rotation A. The groove-type recess of the exhaust passage 36 has in this arrangement a slight incline so that the free communicating cross-section of the exhaust passage 36 is diminished towards the exhaust air source when the exhaust housing 10 is connected to the corresponding part of the device. The exhaust passage 36 thus defines a, relative to the axis of rotation A of the tool 2, substantially radial flow path which, starting from the auxiliary air infeed opening 52 leads along the chip communicating window 26 towards the exhaust air source. The twist direction of the extent of the exhaust passage 36 in the form of a circular arc and the direction of rotation R of the tool 2 are the same in sense.

As already mentioned above, the exhaust housing 10 includes an ancillary exhaust passage 48 which is connected to an exhaust housing ancillary opening 62 provided at an exhaust housing section located outside of the rotating tool 2. The exhaust housing ancillary opening 62 and ancillary exhaust passage 48 are located in the present example in the region of the housing base 20 and thus at a lower section of the exhaust housing 10. The ancillary exhaust passage 48 defines a flow path for an ancillary air stream and ports into an exhaust passage section downstream remote from the chip communicating window 26 relative to the exhaust direction 50, into the exhaust passage 36. The free communicating cross-section of the ancillary exhaust passage 48 is diminished in the direction of the exhaust air source. The exhaust housing ancillary opening 62 may be connecting to an external exhaust hood (not shown) for example.

Figure 3:
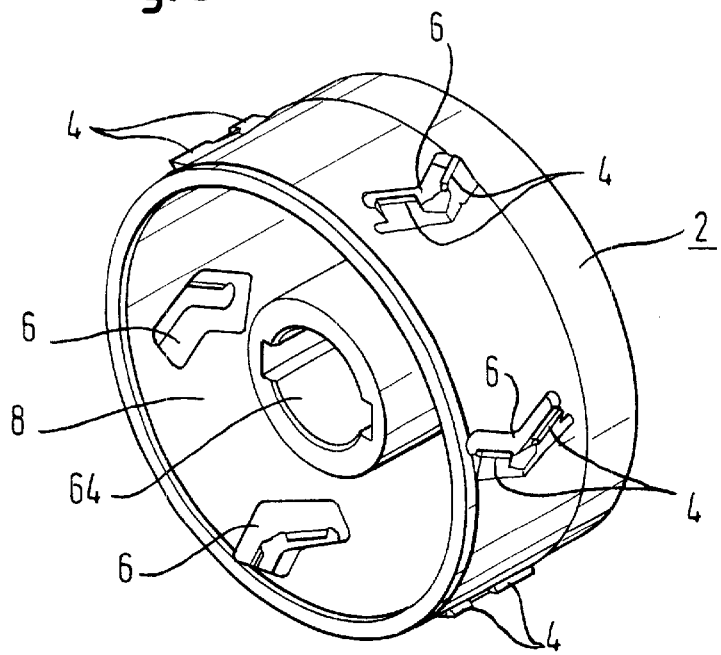
FIG. 3 is a diagrammatic view in perspective of the tool of the device in accordance with the invention as shown in FIG. 1 and FIG. 2.

Referring now to FIG. 3 there is illustrated in a diagrammatic view in perspective the tool 2 of the device in accordance with the invention again making particularly evident the tool cavity 8, the arrangement of the cutters 4, the chip receiving opening 6 for communicating the chips into the tool cavity as well as a drive shaft receiving opening 64 of the tool 2.

Figure 4:
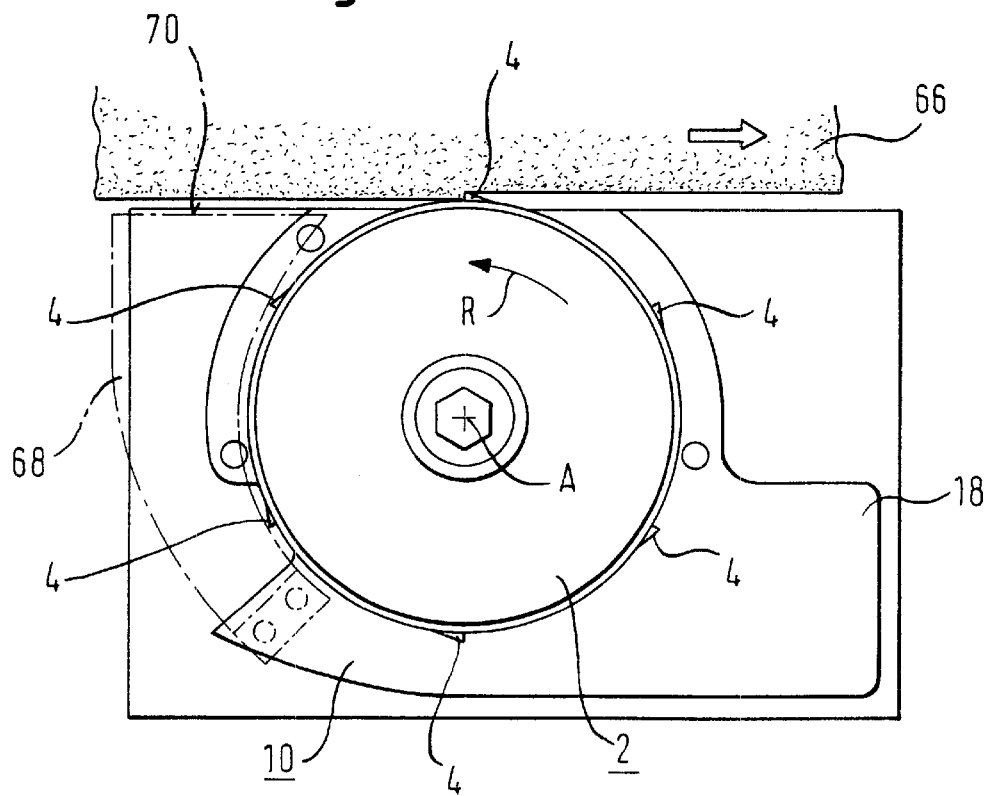
FIG. 4 is a diagrammatic plan view of the first embodiment of the device in accordance with the invention in working operation.

Referring now to FIG. 4 there is illustrated in a diagrammatic plan view of the device in accordance with the invention the first embodiment in working operation. Evident from this FIG. is the arrangement of the tool 2 and exhaust housing 10 relative to the workpiece to be machined 66 (in this case a plate-shaped workpiece having straight workpiece edges). Also indicated by the broken lines in FIG. 4 is an external exhaust hood 68 which is connected to the exhaust housing ancillary opening 62 and the ancillary exhaust passage 48 of the exhaust housing 10 and surrounding the tool 2 radially and axially in part. The external exhaust hood 68 provides external chip removal.

Figure 5:
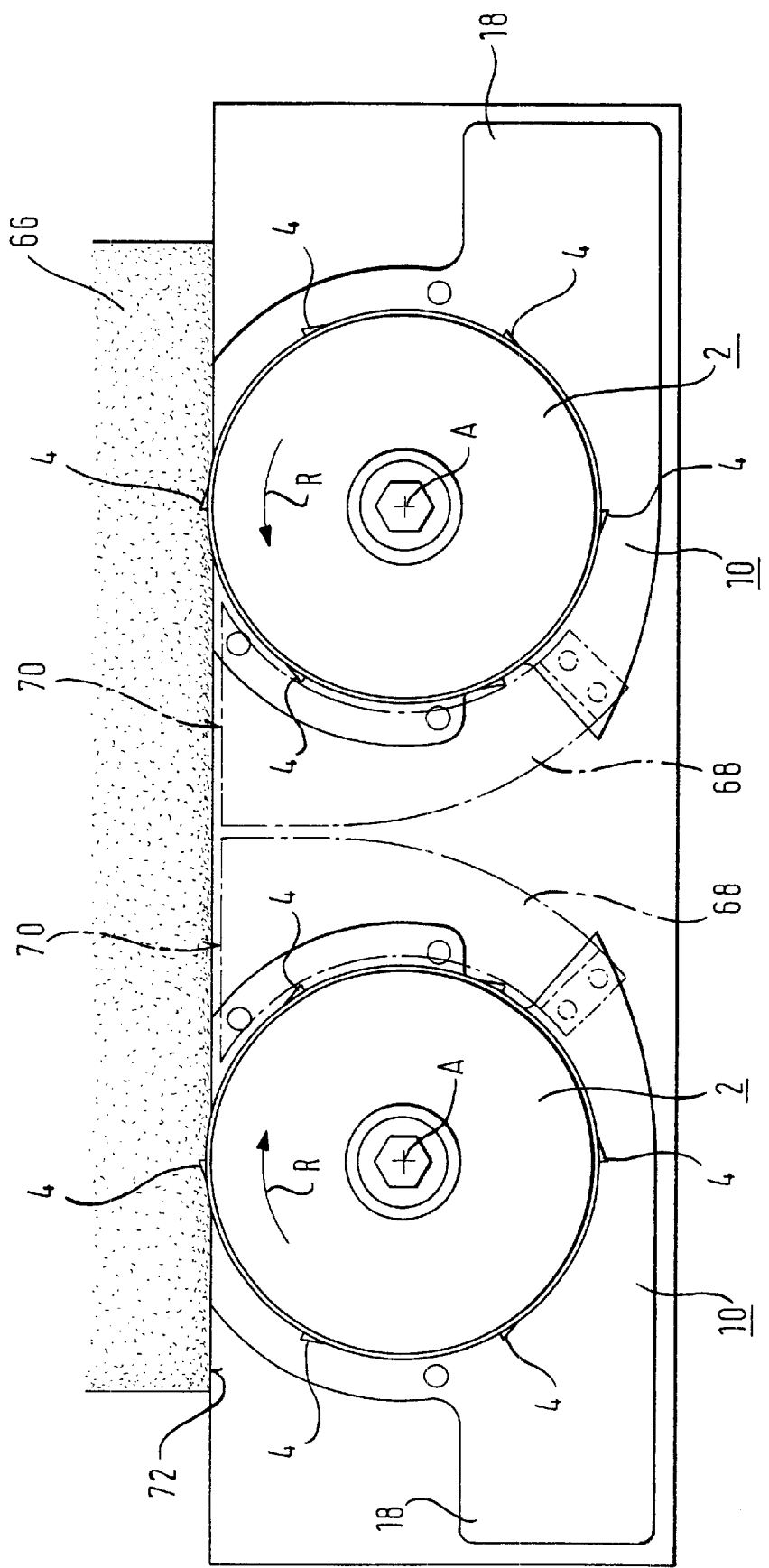
FIG. 5 is a diagrammatic plan view of a second embodiment of the device in accordance with the invention.

Referring now to FIG. 5 there is illustrated a diagrammatic plan view of a second embodiment of the device in accordance with the invention. This variant is practically the same as the first embodiment except that two tools 2, 2 with their respective exhaust housings 10, 10 and external exhaust hoods 68, 68 are arranged mirrored juxtaposed in forming a machining assembly. The tools 2, 2 work opposingly. The external exhaust hoods 68, 68 comprise an upper and a lower exhaust hood opening rim 70 which relative to the axis of rotation A and a cutter trajectory diameter or cutter rotary circle diameter of the tool 2 extend substantially tangentially and is slightly set back from the cutter trajectory diameter towards the axis of rotation A. The tangentially opening rim 70 is thus located opposite the straight workpiece edge 72 of the workpiece 66 to be machined directly over a very small interspace as is clearly evident from the Figure.

Figure 6:
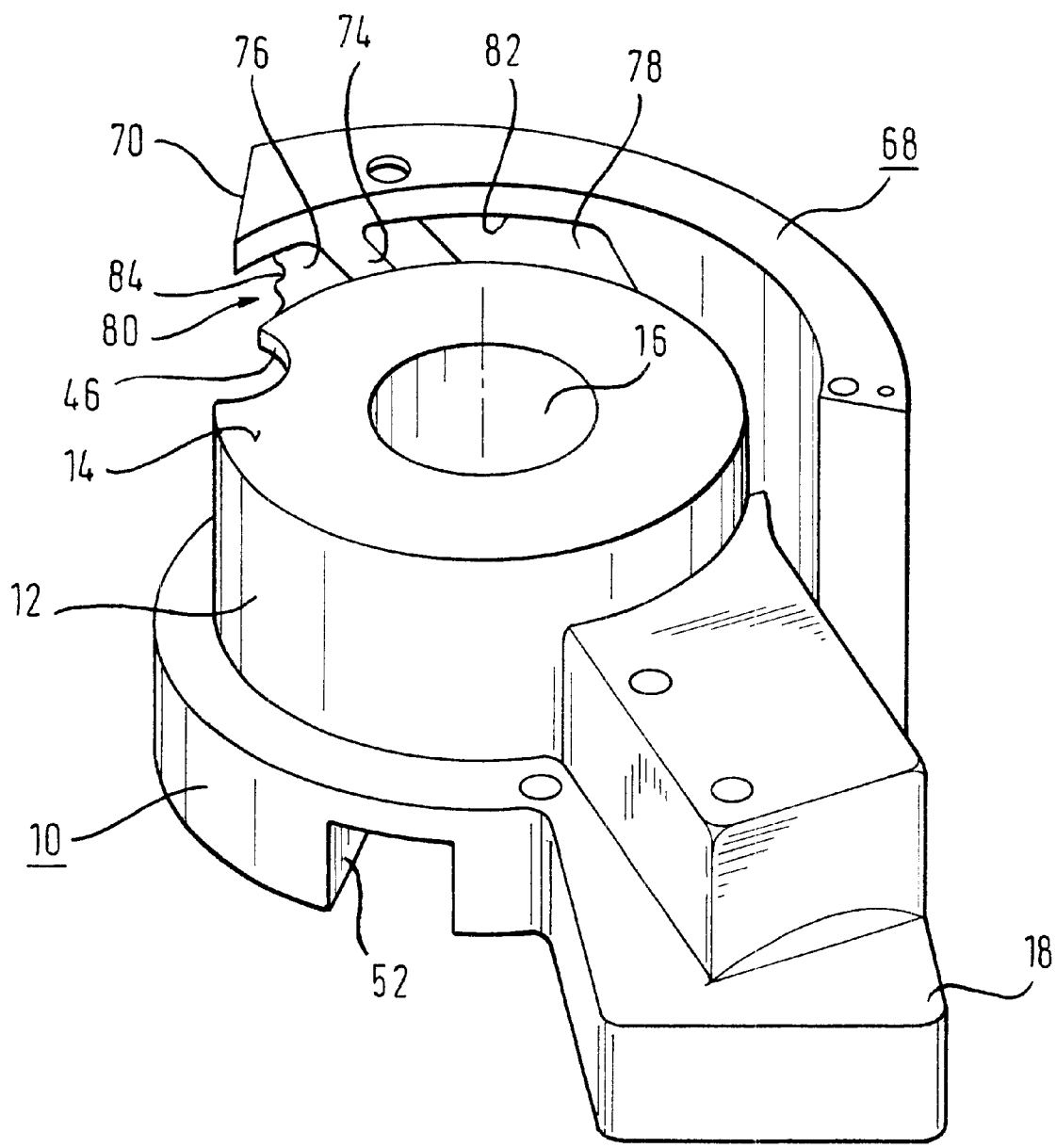
FIG. 6 is a diagrammatic view in perspective of an exhaust housing including an external exhaust hood connected thereto, including external chip guidance of the device in accordance with the invention.

Referring now to FIG. 6 there is illustrated a diagrammatic view in perspective of an exhaust housing 10 including an external exhaust hood 68 connected thereto with an external chip guidance of the device in accordance with the invention. As evident from the drawing the exhaust hood 68 comprises several, i.e. in this case two, exhaust hood passages 76, 78 separated from each other by a guide rib 74 which extends both radially and axially about the tool 2 (see FIG. 1) and which are connected to the exhaust housing ancillary opening 62 (see FIG. 2) of the exhaust housing 10. The first exhaust hood passage 76, which in this variant guides the ancillary air stream, ports downstream directly into the exhaust hood opening 80 facing the workpiece in this case, whilst the second exhaust hood passage second exhaust hood passage 78, which in this variant guides an additional air stream, ports downstream into a side opening 82 facing the radial side or circumferential surface areas of the tool 2. The chips entrained by the ancillary air stream and the additional air stream are directed radial about the tool 2 and axial downwards into the exhaust housing ancillary opening 62 (not shown in this FIG.) and into the ancillary exhaust passage 48 of the exhaust housing 10. The exhaust hood 68 comprises in this example embodiment an irregular shaped exhaust hood opening rim 84.

The function of the device in accordance with the invention as well as the method in accordance with the invention for machining workpieces, more particularly workpieces of wood-based materials, plastics or the like by means of this device will now be detailed with reference to the FIGS. 1 to 6.

In active operation of the device in accordance with the invention, i.e. with the tool 2 rotating and the exhaust air source activated, a substantially constant exhausting main air stream is generated and made available which is directed, relative to the axis of rotation A of the tool 2, on a substantially radial flow path, starting from the auxiliary air infeed opening 52, along the chip communicating window 26 in the direction of the exhaust air source and subsequently flows by this path along the chip communicating window 26 in the direction of the exhaust air source.

The main air stream is generated by an (outer) air stream flowing pulsating through the chip receiving opening 6 and chip communicating window 26 due to the effect of the exhaust air source and rotation of the tool 2 being mixed with an auxiliary air stream flowing through the auxiliary air infeed opening 52 by the effect of the exhaust air source within the exhaust passage 36 or by both streams being superimposed. By means of the irregular shaped front and rear window rima 28, 30 of the chip communicating window 26 the pulsating inflowing (outside) air stream is automatically swirled. In addition, by means of the irregular shaped front and rear window rims 28, 30 an air layer entrained due to rotation of the tool 2 in its cavity 8 and flowing at the outer side of the pot section 12 protruding into the cavity 8 and along the chip communicating window 26 is automatically swirled at these window rims 28, 30.

By means of the radial first sweeper edge 42 and the axial second sweeper edge 44 any chips sticking to or having accumulated at the radial inner surface area of the tool cavity 8 as well as any chips sticking to or having accumulated at a portion of the tool cavity 8 opposite the face 14 of the pot section 12 are swept away and directed by means of the air stream flowing through the face opening 46 and the (outside) air stream flowing into the chip communicating window 26 into the exhaust passage 36. The radial first sweeper edge 42 has simultaneously the dual function of additionally sweeping a substantial proportion of the air layer entrained by the rotating tool 2 at the radial inner wall thereof. The swept air mass gains access together with the inflow of the (outside) air stream to the exhaust passage 36, although it is likewise basically conceivable to apply air layer sweeper to the face of the pot section.

Chips flying through the chip communicating window 26 into the exhaust passage 36 are further transported by the main air stream substantially in the direction of their natural trajectory and then discharged via the flow path of the main air stream in the direction of the exhaust air source.

In the case of the variant as shown in FIG. 6 a substantially constant, exhausting ancillary air stream is generated and made available within the ancillary exhaust passage 48 connected to the exhaust housing ancillary opening 62 as well as within the first exhaust hood passage 76 of the exhaust hood 68 with the aid of the exhaust air source. By means of the ancillary air stream, chips are captured and discharged which are located in a spatial portion upstream of the exhaust hood opening 80 facing the workpiece (or in a spatial portion surrounding the latter) of the exhaust hood 68 which is connected to the exhaust housing ancillary opening 62. By merging the main air stream and the ancillary air stream at the flow section downstream remote from the chip communicating window 26, relative to the exhaust direction 50, the chips entrained by these two streams are discharged by a common further flow path in the direction of the exhaust air source.

In the present example, by means of the exhaust air source and the ancillary air stream a substantially constant exhausting additional air stream is furthermore generated and made available in the second exhaust hood passage 78 of the external exhaust hood 68 and at the outer side or outer surface area of the tool 2. In this way the circumferential or outer surface areas of the tool 2 are exhausted via the side opening 82 in forming an external chip guidance. The additional air stream and ancillary air stream are merged in the present example in the ancillary exhaust passage 48. The chips entrained by these two streams are thus discharged in the direction of the exhaust air source by a common further flow path which translates into the flow path of the main air stream.

In flowing into the exhaust hood opening 80 the ancillary air stream is automatically swirled by the irregular shaped opening rim 84 or the like. Furthermore, the air layer entrained due to rotation of the tool 2 at the outer side thereof and flowing along the exhaust hood opening 80 is automatically swirled at the exhaust hood opening rim 84.

The invention is not restricted to the example embodiments as described above which merely serve to explain the gist of the invention in general. Instead, aspects and embodiments other than those as described above are within the scope of protection afforded by the device and method in accordance with the invention which may comprise more particularly features representing a combination of all individual features in each case or only of specific individual features of the corresponding claims. Although in the above examples a main air stream is described which is guided by a substantially radial flow path it is just as possible to make available a main air stream and corresponding oriented flow paths flowing axially relative to the axis of the tool. Where an axial main air stream is concerned, the trajectory, as a rule, of the chips flying through the chip communicating window into the exhaust passage needs to be deflected more strongly. For this purpose deflection means, for example in the form of baffles or the like may be made available. Within the passages of the exhaust housing as well as of the exhaust hood additional guiding elements and/or sweeper means may be provided. The chip communicating window may be bevelled in the flying direction of the chips. It is furthermore conceivable, without departing from the gist of the invention, to configure the face opening as an auxiliary air infeed opening in certain applications, and vice-versa. In one modification of the exhaust housing the ancillary exhaust passage may also run at least in part within the passages. Embodiments are achievable in which the exhaust hood is configured integral with the exhaust housing and vice-versa. The exhaust housing and exhaust hood may be fitted with centering elements permitting precise positioning and fitting of these parts to other components of the device. The exhaust housing and exhaust hood are in addition compatible with sealing elements to reduce exhaust air losses. For generating each air stream individual exhaust air source may be employed instead of a single common exhaust air source. As an alternative to an exhaust air source a compressed air source is also basically conceivable. The device in accordance with the invention may be provided with suitable means for checking and/or regulating and/or controlling operation.

It is understood that reference numerals in the claims, in the description and drawings merely serve to better appreciate the invention and are not to be interpreted as being restrictive in scope.

LIST OF REFERENCE NUMERALS 2 tool
4 cutters of 2
6 chip receiving opening of 2
8 cavity of 2
10 exhaust housing
12 pot section of 10
14 face of 12
16 communicating opening in 12
18 connection of 10
20 housing base of 10
22 housing foot of 10
24 bolting holes
26 chip communicating window in 12
28 front, irregularly shaped window rim of 26
30 rear, irregularly shaped window rim of 26
32 upper window rim of 26
34 lower window rim of 26
36 exhaust passage
38 protuberances (corrugated)
40 recesses (corrugated)
42 radial, first sweeper edge
44 axial, second sweeper edge
46 face opening in 12
48 ancillary exhaust passage
50 exhaust direction
52 auxiliary air infeed opening
54 groove-type recess
56 countersunk drilling
58 auxiliary air passage
60 parting wall
62 exhaust housing ancillary opening
64 drive shaft receiving opening of 2
66 workpiece
68 exhaust hood(s)
70 tangential exhaust hood opening rim
72 workpiece edge (straight)
74 guide rib in 68
76 first exhaust hood passage
78 second exhaust hood passage
80 exhaust hood opening
82 side opening of 68
84 irregularly shaped exhaust hood opening rim
A axis of rotattion of 2
R direction of rotation of 2

What is claimed is:

1. A device for machining workpieces of wood-based materials, plastic or the like, comprising:
    at least one chip removing, rotating tool configured substantially as a hollow body including at least one cutter, a portion of said tool adjoining said cutter being penetrated by a chip receiving opening for communicating chips into a cavity of said tool; and
    an exhaust means including a stationary exhaust housing configured substantially as a hollow body communicating with or protruding into said cavity of said tool at least partly and in connection with at least one exhaust air source,
    that part of said exhaust housing which is communicating with or protruding into said cavity of said tool comprising, in a region of an effective site of said tool assigned to said cutter, at least one chip communicating window porting into an exhaust passage of said exhaust housing, and
    said exhaust passage comprising in an exhaust passage section upstream of said chip communicating window, relative to an exhaust direction, at least one auxiliary air infeed opening,
    wherein said exhaust housing comprises at least one ancillary exhaust passage which is connected to at least one exhaust housing section provided outside of said rotating tool, and that said ancillary exhaust passage defines a flow path for an ancillary air stream and ports into an exhaust passage section downstream, remote from said chip communicating window relative to said exhaust direction, into said exhaust passage.

2. The device as set forth in claim 1, wherein said tool is configured substantially as a pot-shaped hollow body.

3. The device as set forth in claim 1, wherein said part of said exhaust housing communicating with said cavity of said tool substantially fills said cavity totally.

4. The device as set forth in claim 1, wherein said part of said exhaust housing communicating with said cavity of said tool is configured pot-shaped.

5. The device as set forth in claim 1 including a tool whose cavity is shaped cylindrical, wherein said part of said exhaust housing communicating with said cavity of said tool is shaped substantially cylindrical.

6. The device as set forth in claim 1 including a tool whose cavity is shaped conical, wherein said part of said exhaust housing communicating with said cavity of said tool is shaped substantially conical.

7. The device as set forth in claim 1, wherein said exhaust housing comprises a communicating opening or a recess for receiving a drive means comprising a shaft or spindle of said tool.

8. The device as set forth in claim 1, wherein said exhaust passage defines, relative to an axis of rotation of said tool, a substantially radial flow path which starting from said auxiliary air infeed opening guides along said chip communicating window in a direction of said exhaust air source.

9. The device as set forth in claim 1, wherein said exhaust passage, starting from said chip communicating window or said auxiliary air infeed opening and relative to an axis of rotation of said tool extends substantially radial in the form of a circular arc or spiral about said axis of rotation.

10. The device as set forth in claim 9, wherein a swirl direction of an extent of said exhaust passage in the form of a circular arc or spiral and a direction of rotation of said tool are the same in sense.

11. A method for machining work pieces of wood-based materials, plastics or the like, by means of a device having at least one chip removing, rotating tool configured substantially as a hollow body including at least one cutter, a portion of said tool adjoining said cutter being penetrated by a chip receiving opening for communicating chips into a cavity of said tool; and an exhaust means including a stationary exhaust housing configured substantially as a hollow body communicating with or protruding into said cavity of said tool at least partly and in connection with at least one exhaust air source, that part of said exhaust housing which is communicating with or protruding into said cavity of said tool comprising, in a region of an effective site of said tool assigned to said cutter, at least one chip communicating window porting into an exhaust passage of said exhaust housing, and said exhaust passage comprising in an exhaust passage section upstream of said chip communicating window, relative to an exhaust direction, at least one auxiliary air infeed opening, the method comprising the following steps for exhausting chips materializing in machining:

generating and making available a main air stream flowing substantially constant, exhausting and within said exhaust passage along said chip communicating window, generating and making available at least one substantially constant exhausting ancillary air stream within an ancillary exhaust passage connected to an exhaust housing ancillary opening, and merging said main air stream and said ancillary air stream at a flow section remote downstream of said chip communicating window, relative to said exhaust direction.

12. The device as set forth in claim 1, wherein, relative to a direction of rotation of said tool, a front window rim of said chip communicating window is recessed substantially concave.

13. The device as set forth in claim 1, wherein said chip communicating window comprises at least one irregular shaped window rim.

14. The device as set forth in claim 13, wherein said irregular shaped window rim is configured at a side of said chip communicating window extending transversely to a direction of rotation of said tool.

15. The device as set forth in claim 13, wherein said irregular shaped window rim comprises toothed protuberances and/or recesses.

16. The device as set forth in claim 14, wherein said irregular shaped window rim comprises toothed protuberances and/or recesses.

17. The device as set forth in claim 15, wherein said toothed protuberances and/or recesses are corrugated.

18. The device as set forth in claim 16, wherein said toothed protuberances and/or recesses are corrugated.

19. The device as set forth in claim 1, wherein, relative to a direction of rotation of said tool, at least one front window rim of said chip communicating window comprises a chip sweeper.

20. The device as set forth in claim 12, wherein said front window rim comprises, relative to an axis of rotation, a radial first sweeper edge which relative to a radial extent of a rear window rim protrudes radially beyond said rear window rim.

21. The device as set forth in claim 12, wherein said front window rim comprises, relative to an axis of rotation of said tool, an axial second sweeper edge which protrudes beyond an axial face of that part of said exhaust housing communicating with said cavity of said tool.

22. The device as set forth in claim 1, wherein an axial face of that part of said exhaust housing which is communicating with or protruding into said cavity of said tool comprises a face, axial closing off said part, and is provided in said face with a face opening which ports into said exhaust passage.

23. The device as set forth in claim 22, characterized in that said face opening ports into said chip communicating window.

24. The device as set forth in claim 22, wherein said face opening in a region of a radial first sweeper edge and/or in a region of an axial second sweeper edge ports into said chip communicating window.

25. The device as set forth in claim 23, wherein said face opening in a region of a radial first sweeper edge and/or in a region of an axial second sweeper edge ports into said chip communicating window.

26. The device as set forth in claim 1, further comprising at least one exhaust hood which surrounds said tool at least in part.

27. The device as set forth in claim 26, wherein said exhaust hood comprises one or more exhaust hood passages.

28. The device as set forth in claims 1, further comprising at least one exhaust hood which surrounds said tool at least in part, said exhaust hood being connected to said ancillary exhaust passage of said exhaust housing.

29. The device as set forth in claim 28, wherein said exhaust hood comprises one or more exhaust hood passages.

30. The device as set forth in claim 26, wherein said exhaust hood protrudes beyond said tool axially.

31. The device as set forth in claim 28, wherein said exhaust hood protrudes beyond said tool axially.

32. The device as set forth in claim 26, wherein said exhaust hood includes an irregular shaped exhaust hood opening rim.

33. The device as set forth in claim 28, wherein said exhaust hood includes an irregular shaped exhaust hood opening rim.

34. The device as set forth in claim 26, wherein said exhaust hood includes an exhaust hood opening rim which, relative to an axis of rotation and a cutter trajectory diameter of said tool, extends substantially tangentially and is slightly set back from said trajectory diameter in a direction of said axis of rotation.

35. The device as set forth in claim 28, wherein said exhaust hood includes an exhaust hood opening rim which, relative to an axis of rotation and a cutter trajectory diameter of said tool, extends substantially tangentially and is slightly set back from said trajectory diameter in a direction of said axis of rotation.

36. The method as set forth in claim 11, comprising the step automatically swirling an air layer entrained due to rotation of said tool at an outer side thereof and flowing along an exhaust hood opening rim to said exhaust hood opening rim.

37. The method as set forth in claim 11, comprising the step directing said main air stream, relative to an axis of rotation of said tool, on a substantially radial flow path starting from said auxiliary air infeed opening along said chip communicating window in a direction of said exhaust air source.

38. The method as set forth in claim 11, comprising the step generating and making available a substantially constant exhausting additional air stream at an outer side of said tool.

39. The method as set forth in claim 38, comprising the step directing said additional air stream into said ancillary exhaust passage.

40. The method as set forth in claim 36, comprising the step automatically swirling an outside air stream flowing pulsating due to rotation of said tool through said chip communicating window into said exhaust passage of said exhaust housing at at least one window rim of said chip communicating window.

41. The method as set forth in claim 11, comprising the step automatically swirling an air layer entrained due to rotation of said tool into said cavity thereof and flowing at an outer side of said exhaust housing protruding into said cavity of said tool and along said chip communicating window at a window rim of said chip communicating window.

42. The method as set forth in claim 40, comprising the step mixing said pulsating inflow of outside air stream with said substantially constant main air stream in said exhaust passage.

43. The method as set forth in claim 11, comprising the step automatically swirling said ancillary air stream at at least one exhaust hood opening rim and/or at said exhaust housing ancillary opening.

44. The method as set forth in claim 38, comprising the step automatically swirling said additional air stream at at least one exhaust hood opening rim and/or at said exhaust housing ancillary opening.

* * * * *

UNITED STATES PATENT AND TRADEMARK OFFICE
CERTIFICATE OF CORRECTION

PATENT NO. : 6,454,499 B1
DATED : September 24, 2002
INVENTOR(S) : Gittel et al.

It is certified that error appears in the above-identified patent and that said Letters Patent is hereby corrected as shown below:

<u>Column 23,</u>
Line 10, change "36" to -- 11 --.

Signed and Sealed this

Seventeenth Day of December, 2002

JAMES E. ROGAN
*Director of the United States Patent and Trademark Office*